(12) United States Patent
Wilson et al.

(10) Patent No.: US 9,743,634 B2
(45) Date of Patent: Aug. 29, 2017

(54) METHOD AND APPARATUS FOR MONITORING A MILKING PROCESS (71) Applicant: Lely Patent N.V., Maassluis (NL)

(72) Inventors: Allan Walter Wilson, Hamilton (NZ); Michiel Adriaan Van Dorp, Hazerswoude (NL)

(73) Assignee: LELY PATENT N.V., Maassluis (NL)

( * ) Notice: Subject to any disclaimer, the term of this patent is extended or adjusted under 35 U.S.C. 154(b) by 50 days.

(21) Appl. No.: 13/726,250

(22) Filed: Dec. 24, 2012

(65) Prior Publication Data

US 2014/0174366 A1 Jun. 26, 2014

(51) Int. Cl.
*A01J 5/007* (2006.01)

(52) U.S. Cl.
CPC .............. *A01J 5/007* (2013.01); *A01J 5/0075* (2013.01)

(58) Field of Classification Search
CPC .. A01J 5/017; A01J 5/007; A01J 5/013; A01J 5/0136; A01J 5/02; A01J 5/04; A01J 5/042; A01J 5/044; A01J 5/16; A01J 5/0075
USPC ...................... 119/14.08, 14.05, 14.14, 14.45
See application file for complete search history.

(56) References Cited

U.S. PATENT DOCUMENTS

| | | | | |
|---|---|---|---|---|
| 5,809,932 A | * | 9/1998 | van den Berg | A01J 5/007 119/14.08 |
| 5,970,910 A | * | 10/1999 | Grimm | A01J 5/007 119/14.02 |
| 6,009,832 A | * | 1/2000 | Innings et al. | 119/14.02 |
| 6,073,579 A | * | 6/2000 | Innings et al. | 119/14.02 |
| 6,553,934 B2 | * | 4/2003 | Gentner et al. | 119/14.02 |
| 6,598,560 B1 | * | 7/2003 | van den Berg | 119/14.08 |
| 6,823,817 B2 | * | 11/2004 | van den Berg et al. | 119/14.02 |
| 7,841,296 B2 | * | 11/2010 | Brown et al. | 119/14.08 |
| 7,926,449 B2 | * | 4/2011 | Stellnert et al. | 119/670 |
| 2002/0139308 A1 | * | 10/2002 | Oort et al. | 119/14.02 |
| 2003/0061993 A1 | * | 4/2003 | Vijverberg et al. | 119/14.14 |
| 2010/0236487 A1 | * | 9/2010 | Stellnert et al. | 119/14.08 |
| 2012/0145082 A1 | * | 6/2012 | Van Den Berg | 119/14.02 |

FOREIGN PATENT DOCUMENTS

| | | |
|---|---|---|
| EP | 953829 A2 | 11/1999 |
| GB | 2263612 A | 8/1993 |
| WO | 9636213 A1 | 11/1996 |
| WO | 9723127 A1 | 7/1997 |
| WO | WO 2011014064 A1 * | 2/2011 .............. A01J 5/007 |

* cited by examiner

*Primary Examiner* — Joshua Huson
(74) *Attorney, Agent, or Firm* — Oblon, McClelland, Maier & Neustadt, L.L.P.

(57) ABSTRACT

A method of monitoring a milking process by a milking apparatus that includes a teatcup with a pulsation space and an airline to deliver varying levels of pressure to the pulsation space. The method includes: measuring airflow within the airline to obtain an indication of volume of displaced air within the pulsation space; comparing the volume with a reference value; and determining a connection parameter, indicating how the teatcup is connected to the teat, based on the comparison. The displaced air volume correlates to the extent the teat protrudes into the teatcup, thus providing information on how the teatcup is connected. Also provided is a milking system incorporating the method.

9 Claims, 6 Drawing Sheets

METHOD AND APPARATUS FOR MONITORING A MILKING PROCESS

BACKGROUND OF THE INVENTION

1. Field of the Invention

The present invention relates to a method and apparatus for monitoring a milking process. More particularly the present invention relates to monitoring a milking process obtaining an indication of volume of displaced air within a teatcup.

2. Description of the Related Art

In any milking system, it is important to ensure that teatcups are properly connected to the teats of animals being milked. Improper connection may result in inefficient milking—if any milk at all may be extracted—and potentially cause damage to the udder. If a teatcup becomes completely disconnected, there is a risk that extraneous material within the milking environment will be sucked into the milk delivery system, which is highly undesirable.

The ability to detect this is especially important in an automated milking system, such as those controlled by a robot, where operators are not always present to observe an improper connection and readjust the teatcup.

Currently, sound and pressure measurements within the milking line are commonly used to determine whether the teatcup is properly connected. Document EP-0953829A1 which is hereby incorporated by reference in its entirety, provides an example of one such method based on the measurement of sound within the milking line and comparison of these measurements with predetermined reference values to determine whether present conditions within the line indicate that the teatcup is correctly connected to the teat.

Such methods suffer limitations due to the nature of the environment within the milking line. In particular, the passage of liquid within the line creates significant levels of interference which makes obtaining consistent and accurate measurements difficult. Connection of the milking line to other elements within the milking plant also introduces other sources of noise. As a result such techniques have low sensitivity as to the quality of the connection.

Furthermore, such methods require placement of sensors within the milking line between the teatcups and milk receiver. The environment surrounding the teatcups is harsh, for example due to exposure to liquid (including cleaning chemicals), impact, and variation in temperature. Positioning of the sensor at this point is also not conducive to the generally desirable objective of minimising bulk and weight to the milking implement. Also, being associated with the milking line the apparatus is subject to greater scrutiny with regard to health standards.

BRIEF SUMMARY OF THE INVENTION

It is an object of the present invention to address the foregoing problems or at least to provide the public with a useful choice.

All references, including any patents or patent applications, cited in this specification are hereby incorporated by reference. No admission is made that any reference constitutes prior art.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

According to one aspect of the present invention there is provided a method of monitoring a milking process, the milking process performed by a milking apparatus including at least one teatcup configured to receive a teat of a milking animal and at least one airline configured to deliver varying levels of pressure to the teatcup, the method including the steps of:

measuring airflow within the airline using a flow sensor to obtain an indication of volume of displaced air within the teatcup;

comparing the indication of volume with a reference value; and determining a connection parameter relating to an extent of connection between the teat and the teatcup based on the comparison.

According to another aspect of the present invention there is provided a control device for monitoring a milking process, the milking process performed by a milking apparatus including at least one teatcup configured to receive a teat of a milking animal and at least one airline configured to deliver varying levels of pressure to the teatcup, the device including:

a flow sensor configured to measure airflow within the airline in order to obtain an indication of volume of displaced air within the teatcup; and at least one processor configured to:

compare the indication of volume with a reference value; and determining a connection parameter relating to an extent of connection between the teat and the teatcup based on the comparison.

According to another aspect of the present invention there is provided a robotic automatic milking implement configured to perform a milking process, the implement including:

at least one teatcup configured to receive a teat of a milking animal;

at least one airline configured to deliver varying levels of pressure to the teatcup;

a robot arm configured to connect the teatcup to the teat; and a control device for monitoring the milking process, the device including:

a flow sensor configured to measure airflow within the airline in order to obtain an indication of volume of displaced air within the teatcup; and at least one processor configured to:

compare the indication of volume with a reference value; and determining a connection parameter relating to an extent of connection between the teat and the teatcup based on the comparison.

Each teatcup typically includes a shell configured to receive a liner. The liner is made of a flexible material, is connected to a milking line at one end, and has on open end configured to receive a teat.

Varying levels of pressure, commonly known as a pulsation cycle, are delivered to a pulsation space between the teatcup shell and liner—alternately exposing the pulsation space to atmospheric pressure and a negative pressure commonly referred to as "vacuum". Within this cycle, there are a number of phases characterised by the level of pressure and direction of airflow.

During phases in which the pulsation space is exposed to vacuum, the liner is pulled away from the teat—allowing the milking line under vacuum to draw milk from the teat. When the pulsation space is exposed to atmosphere the vacuum of the milking line causes the liner to collapse around the teat, blocking the vacuum in the milking line from acting on the teat.

Effectively, the extent to which the teatcup liner collapses directly correlates to the extent the teat protrudes into the teatcup. Due to construction of the teatcup, displacement of the teatcup liner causes airflow from and to the pulsation space via the airline.

An indication of volume of displacement in the pulsation space within the teatcup may be obtained by measuring this airflow, and together with a reference value may be used to determine the connection parameter.

By measuring airflow in the airline the sensor may also be positioned away from the point of milk extraction, minimising sensor requirements with regard to withstanding environmental effects and reducing clutter. Furthermore, activity within the airline is not as constrained by hygiene regulations as the milking line.

PCT Publication WO97/23127, which is hereby incorporated by reference in its entirety discloses measuring airflow to and from the pulsation chamber (also described as momentary volume change in the pulsation chamber), with airflow above a threshold being used to infer abrupt movement of the teatcup liner. This is used to trigger transition between a high or low efficiency pressure level being applied to the teatcup.

WO97/23127 does not disclose inferring an extent of connection between the teat and teatcup from the airflow.

In a preferred embodiment of the present invention an indication of a length of the teat protruding into the teatcup is determined on the basis of the connection parameter.

It should be appreciated that the extent of connection which may be detected is not limited to length of the teat protruding into the teatcup.

For example, the present invention may preferably determine disconnection of the teatcup from the teat on the basis of the connection parameter. An open teatcup would not result in collapse of the liner during exposure of the pulsation space to atmosphere, resulting in minimal displacement of the liner.

Additionally, the present invention may preferably determine improper connection of the teatcup to the teat on the basis of the connection parameter. For example, the teatcup may be connected to the udder of the animal as opposed to a teat. This may block the entrance to the teatcup and cause the liner to fully collapse.

Reference to an indication of volume should be understood to mean any parameter from which the extent of displacement of air from the teatcup may be derived—whether directly or indirectly. It should be appreciated that the indication of volume need not be a calculated value in cubic units accounting for airflow and the cross section of the airline.

For example, in a preferred embodiment the airflow is measured using a thermistor based flow sensor. The output of such a sensor varies with airflow velocity, however the response times of the thermistor may be such that maximum, minimum, or average values of the output waveform may be indicative of volume.

It should be appreciated that this is not intended to be limiting, and that the airflow sensor may be any suitable means known to a person skilled in the art. However the inventor has identified that a thermistor airflow sensor has a number of characteristics which make it particularly suitable to the present invention, such as low cost, and the output being indicative of volume without further processing.

Advantageously, the airflow is measured in a part of the airline that is only intended for admission of air. That is to say, the admitted airflow to relieve the vacuum is measured, not the airflow when vacuum is applied to the pulsation space. Because in almost all cases the admitted air is filtered and/or dried air, this representing a preferred embodiment, there will be less or no problems when measuring this air flow. Contrarily, when airflow is measured through a vacuum line, there may occur problems due to moisture and or dirt sucked into the vacuum line due to the vacuum. Especially moisture forms a problem for many airflow meters, and should be avoided if possible. For this reason, it is also advantageous if, in the control device and or the robotic automatic milking implement according to the invention, the airflow sensor is provided in a part of the airline that is only intended to admit air to the teatcup, in particular to the pulsation space thereof. Again, this holds for example for a connection to ambient air, but explicitly not for the vacuum connection. More advantageously, said part comprises a filter and/or air drying device.

Preferably the indication of volume is obtained by measuring airflow over a predetermined time period. It is envisaged that the predetermined time period may be a pulsation cycle.

The indication of volume may be obtained by averaging the measured airflow over the predetermined time period. Alternatively, the indication of volume may be obtained by determining an extreme value of the measured airflow within the predetermined time period.

In one embodiment, the reference value may be obtained by measuring airflow when the teatcup is not connected to the teat. However, this is not intended to be limiting, as the reference value may for example be a predetermined value expected for a particular configuration of the milking system.

In a preferred embodiment the present invention includes adjusting a position of the teatcup relative to the teat on the basis of the connection parameter.

For example, if the present invention is implemented in a robotic milking machine and it is determined that the teatcup has fallen off, the robot arm acting as a teatcup applicator of the robot may be controlled to reapply the teatcup. Similarly, if it has been determined that the teatcup is incorrectly fitted to a teat, such a robot arm may be controlled to readjust the teatcup.

In an embodiment of the present invention, an alarm may be issued in response to the determined condition. This may be by way of an alarm device such as a siren or light in order to alert an operator that action needs to be taken—particularly in milking systems without automated means for applying the teatcup. Alternatively (or additionally), the alarm may be a virtual notification or record within software monitoring or managing the milking process.

For a firmware and/or software (also known as a computer program) implementation, the techniques of the present invention may be implemented as instructions (for example, procedures, functions, and so on) that perform the functions described. It should be appreciated that the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention may provide at least the following advantages:
  enhanced reliability and sensitivity by conducting measurements within the cleaner environment of the airline in comparison with the milking line;
  greater ease of compliance with hygiene regulations by eliminating interaction with milking line; and
  minimised bulk and weight in the undercow milking apparatus by virtue of locating the sensing apparatus away from this point. This also reduces the likelihood of environmental conditions affecting sensor operation.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
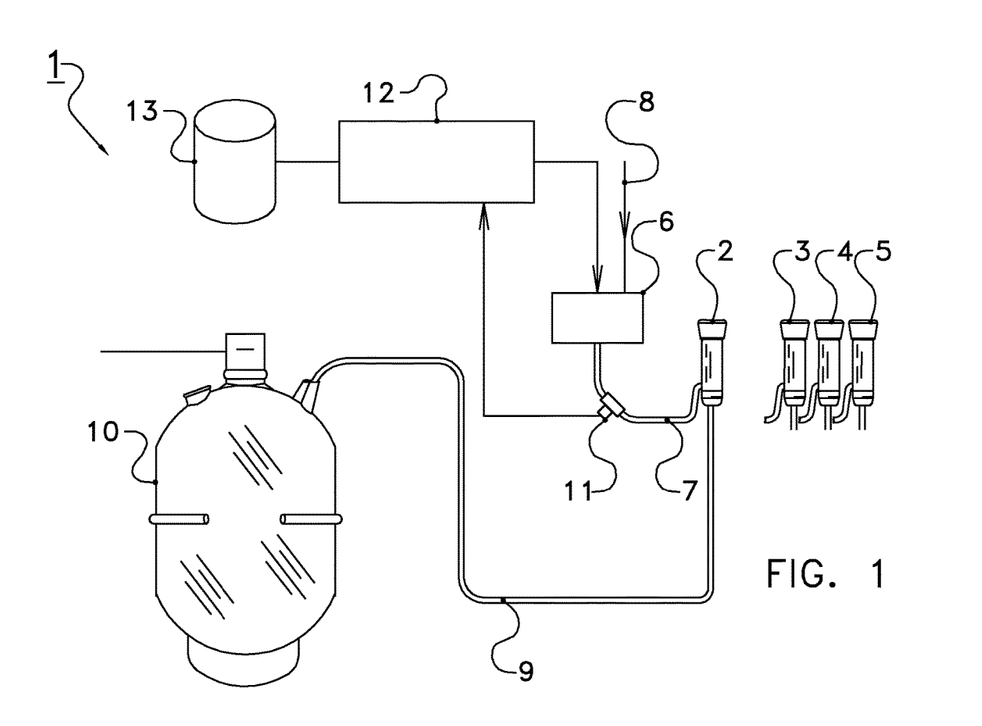
FIG. 1 is a diagrammatic view of a milking device according to one embodiment of the present invention.

The following is a description of certain embodiments of the invention, given by way of example only and with reference to the drawings. FIG. 1 illustrates a milking device (generally indicated by arrow 1) for performing a milking process on a dairy animal. The device 1 includes four teatcups 2, 3, 4, 5, each connected to a pulsator system 6 by way of individual airlines, exemplified by airline 7 which is associated with teatcup 2. The vacuum line 8 for the pulsator system 6 is connected in a usual manner to a vacuum pump with balance tank.

Each teatcup 2, 3, 4, 5 may be automatically connected and disconnected from a teat of a cow by means of a milking robot (as described with reference to FIG. 2).

Figure 2:
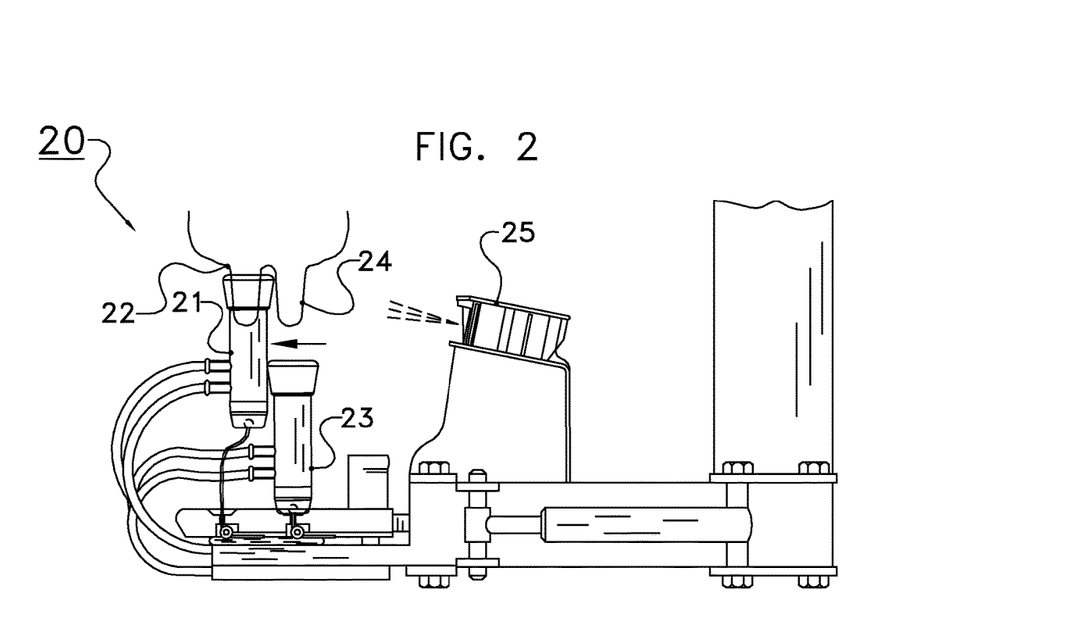
FIG. 2 is a side view of a robot arm for use according to one embodiment of the present invention.

FIG. 2 illustrates a robot arm (generally indicated by arrow 20) for connecting a first teatcup 21 to a first teat 22, and a second teatcup 23 to a second teat 24.

A position-determining device 25 detects the positions of the respective teats 22, 24 and teatcups 21, 23, and guides the teatcups 21, 23 to the teats 22, 24 such that vacuum attaches them.

Retuning to FIG. 1, it should be appreciated that use of a robot arm is not intended to be limiting, as it is envisaged that the teatcups may be applied manually.

The milk extracted by each teatcup 2, 3, 4, 5 is supplied via separate milking lines, exemplified by milking line 9 which is associated with teatcup 2, to a milk jar 10 and ultimately a milk tank.

Each teatcup 2, 3, 4, 5 is provided with a flow sensor, exemplified by flow sensor 11, within their respective airlines—for example airline 7 of teatcup 2—configured to measure airflow within the airline in order to obtain an indication of volume of displaced air within the teatcups 2, 3, 4, 5.

The indication of volume is sent from the sensor 11 to a processor 12. The processor 12 is also in communication with the pulsator system 6. It should be appreciated that the signals communicated from the sensor 11 and pulsator system 6 may include data identifying the respective sensor 11, pulsator within the pulsator system 6, and/or teatcup 2, 3, 4, 5.

Data transmitted to the processor 12 may be stored in memory 13, together with other data used in calculations performed by the processor 12, as described hereinafter.

FIGS. 3a, 3b, 3c, and 3d illustrate interaction of a dairy animal's udder 30 with a teatcup—for example, teatcup 2.

The teatcup 2 includes a shell 31 and a liner 32, between which a pulsation space 33 is formed. The liner 32 is connected to the milking line 9, while the pulsation space 33 is connected by the airline 7 to a pulsator 34, which forms part of the pulsator system 6 of FIG. 1.

The pulsator 34 acts as a valve, controlling connection of the airline 7 to vacuum 9 and atmospheric pressure 35.

Figure 4:
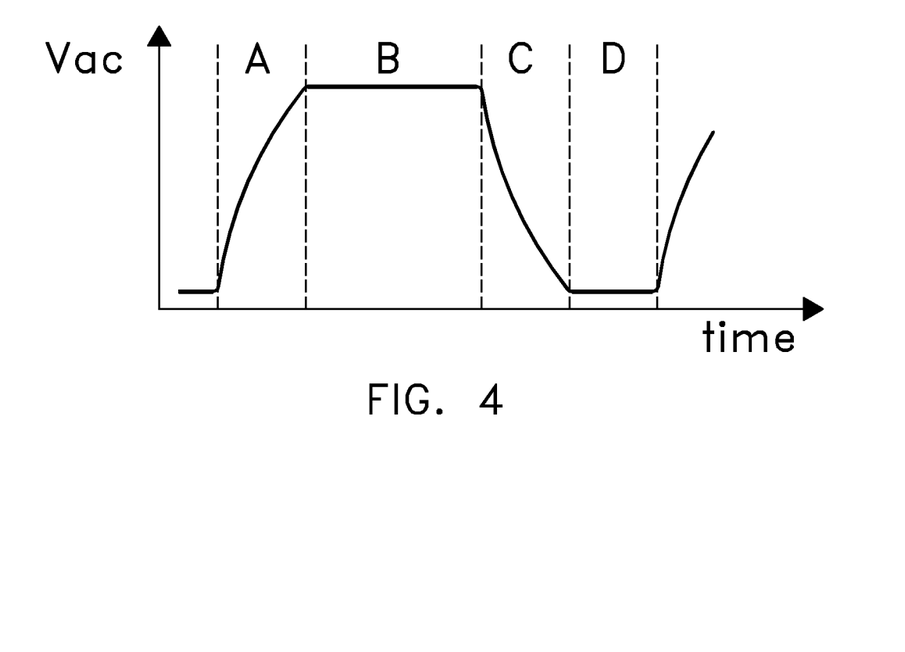
FIG. 4 is a diagram illustrating pressure levels over time in the pulsation space.

FIG. 4 illustrates a typical pulsation cycle, in which the pulsator 34 opens the airline 7 to vacuum 9. The vacuum levels build in phase A to a set vacuum level, which is maintained in phase B. The pulsator 34 then opens the airline 7 to atmospheric pressure 35. Pressure drops during phase C to atmospheric pressure in phase D.

Figure 3A:
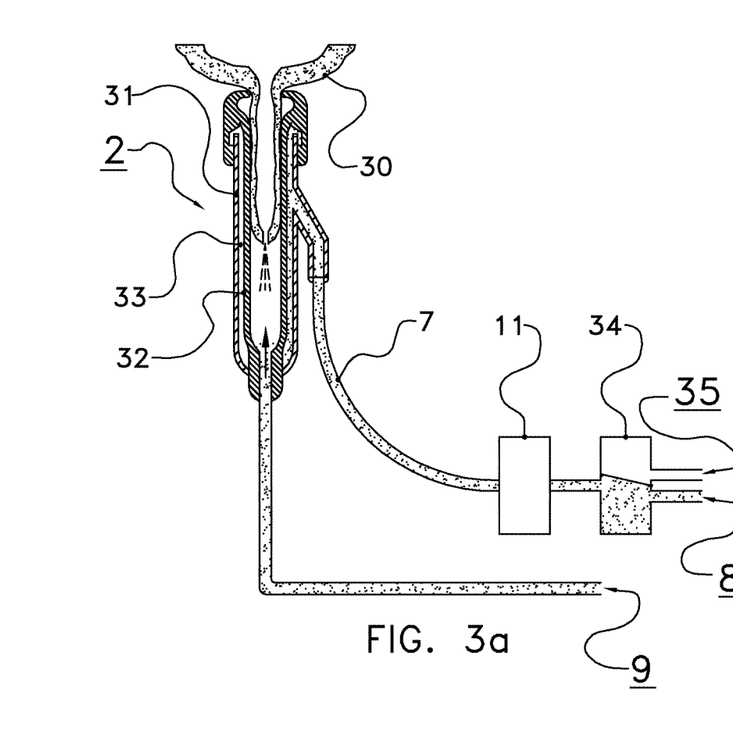
FIGS. 3a-d illustrate extraction of milk using a milking device according to an embodiment of the present invention.

Turning to FIG. 3a, during phases A and B the pressure within the milking line 9 and pulsation space 33 is balanced, causing the liner 32 to be drawn away from the teat 36. This allows the vacuum of the milking line 9 to draw milk out of the teat 36.

Figure 3B:
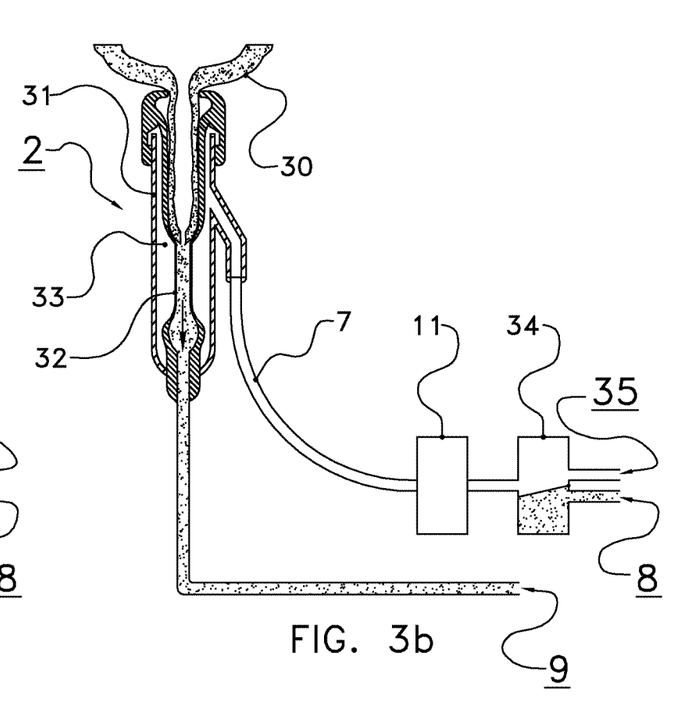

In FIG. 3b, during phases C and D the vacuum of the milking line 9 exceeds the pressure within the pulsation space 33, causing the liner 32 to collapse around the teat 36. This prevents milk from being extracted—providing a rest period for the dairy animal.

Figure 3C:
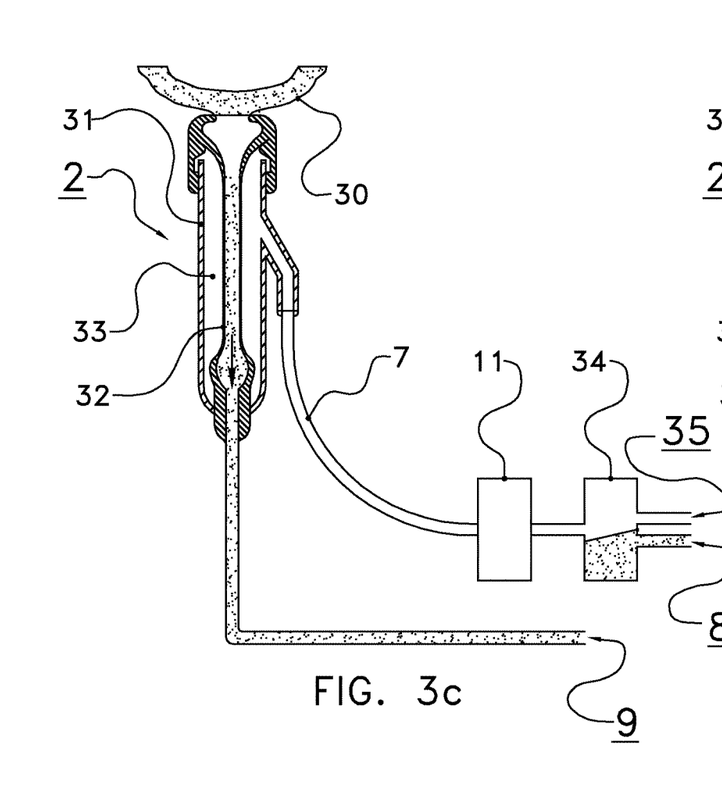

As illustrated by FIG. 3c, the teatcup 2 may be incorrectly applied to the udder 30—either missing a teat or forming an inefficient connection. It may be seen that the liner 32 has completely collapsed.

Figure 3D:
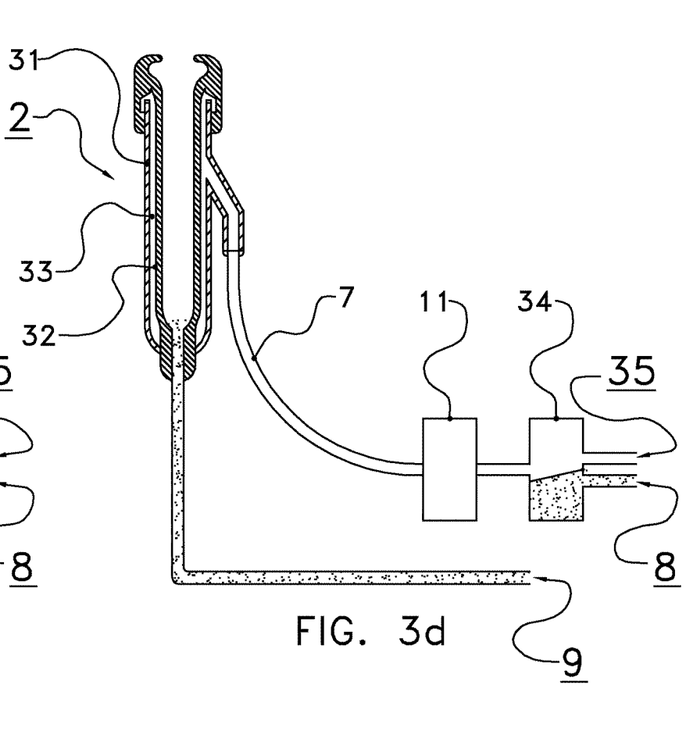

In FIG. 3d, the liner 32 does not collapse regardless of phase as there is no opportunity for the vacuum of the milking line 9 to act against the liner 32 due to the absence of a teat or other form of blockage.

In each case, the flow sensor 11 is positioned in the airline 7.

Figure 8:
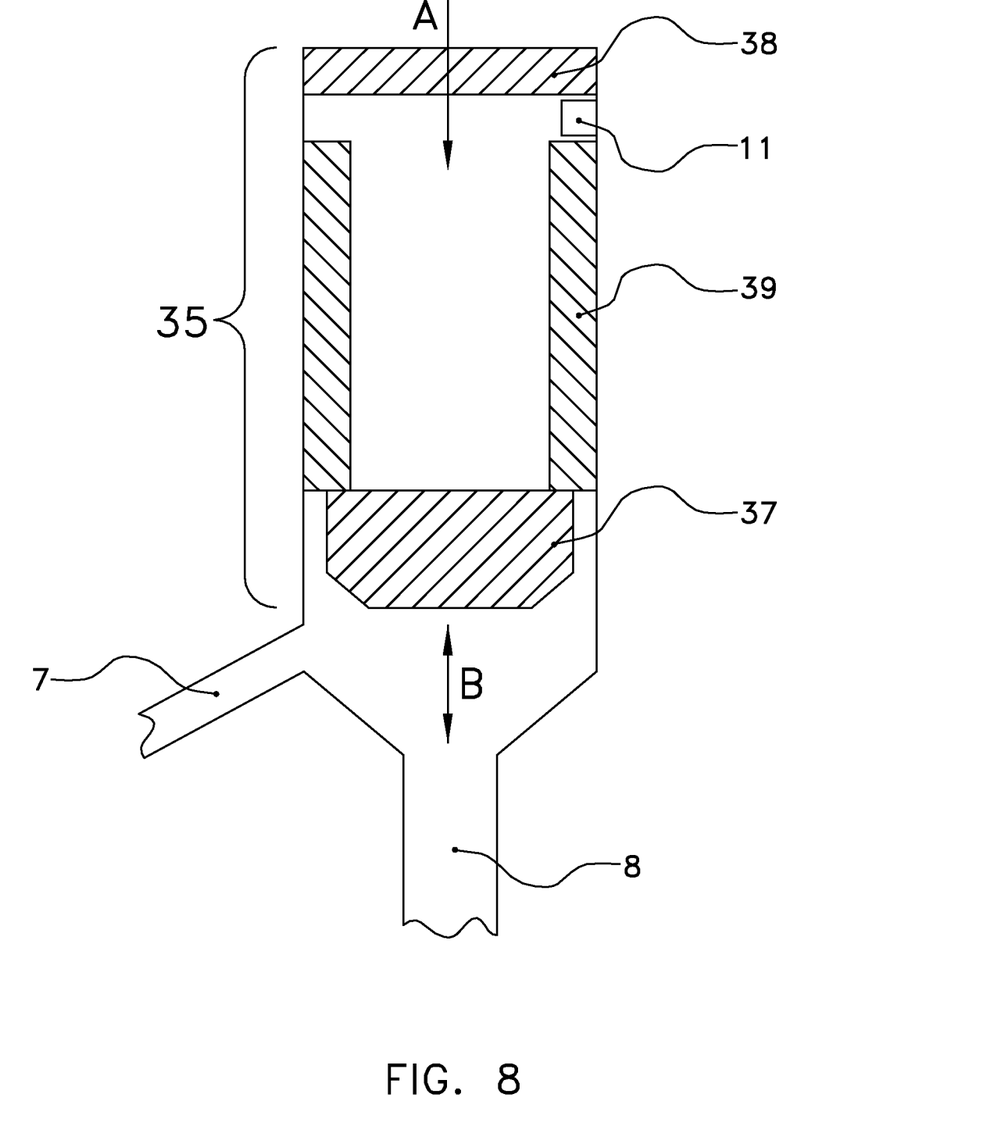
FIG. 8 a diagrammatic sectional view of a pulsator detail of an embodiment of the present invention.

FIG. 8 diagrammatically shows a detail of a pulsator of an embodiment of the invention. It is shown that the airflow sensor 11 is provided in a part 35 of the airline where only atmospheric air is admitted, along arrow A. This air is filtered by filter 38, and optionally dried by a non-shown air drying device. Alternatively, the filter 38 may have drying properties. In the pulsator detail, there are provided an electromagnet 39 for driving a valve body 37 in a direction along double arrow B. In the position shown, the electromagnet 36 is energized and attracts valve body 37 in the upper position, thereby blocking ambient air admission. Now, vacuum is applied to the airline 7 via vacuum line 8. If the electromagnet 36 is de-energized, the valve body 37 will fall and/or be attracted by vacuum, into a lower position, thereby blocking vacuum line 8, and allowing admission of air into airline 7 via the part indicated by reference numeral 35. In the latter part, the airflow sensor 11 measures displaced air. This air has been cleaned and/or dried by filter 38. It is to be noted that other configurations and ways of operating pulsators are possible. The main point for this embodiment is the position of the airflow sensor 11 in a part that is only intended for admitting air, and not vacuum, into the airline 7 to the pulsation space of the teatcup.

Figure 5:
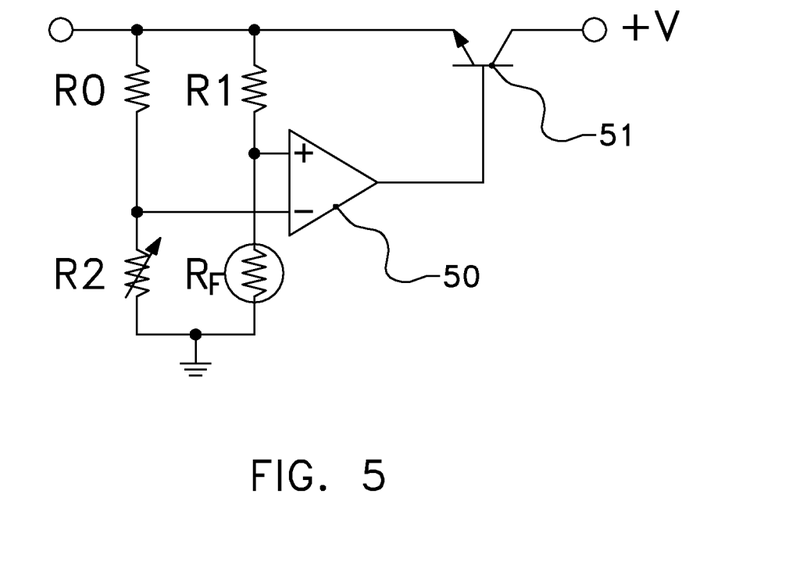
FIG. 5 schematic view of a flow sensor according to an embodiment of the present invention.

FIG. 5 illustrates one embodiment of the flow sensor 11. The sensor includes a thermistor RF, a bridge R0, R1, R2, op amp 50, and a power transistor 51.

The op amp 50 continuously adjusts the flow of current, through the power transistor 51, to maintain its two inputs as equal. It follows that the voltage across the thermistor RF must be maintained at the same voltage across R2, and the thermistor RF current maintained at the level of the current through R1. However, since the current through R1 is proportional to the current through R0 (which has the same voltage drop as R1) and the current through R0 is determined by the voltage drop across R2 it may be seen that the resistance of the thermistor RF must be equal to that of R2, multiplied by the ratio of R1 to R0.

As airflow increases, heat is transferred away from the thermistor RF, causing its voltage to rise. It follows that the op amp 50 output voltage increases, thus increasing the current through the power transistor 51. More power is available for the thermistor RF to dissipate in order to dissipate in order to maintain its temperature (and hence resistance) at a constant level. The output voltage at Vout provides an amplified version of thermistor RF voltage.

Figure 6:
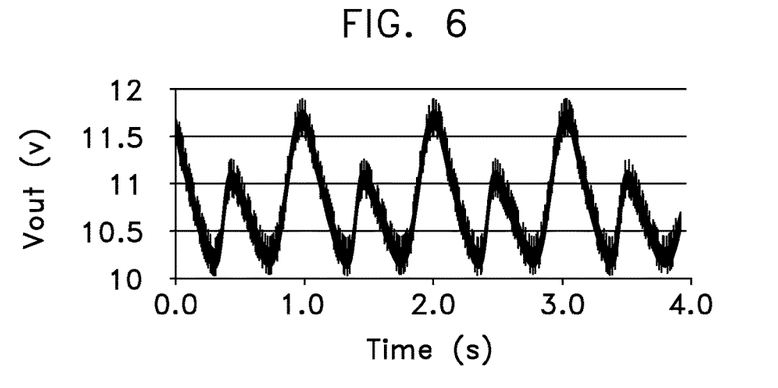
FIG. 6 is an example of measurements of a airflow according to an embodiment of the present invention.

FIG. 6 illustrates an output signal produced by the flow sensor 11 of FIG. 5.

The graph shows Vout versus time in the scenario of FIG. 3d, where passage through the liner 32 is open. The waveforms which would be obtained under the conditions illustrated by FIGS. 3a and 3b, and 3c, would have a similar profile.

Figure 7:
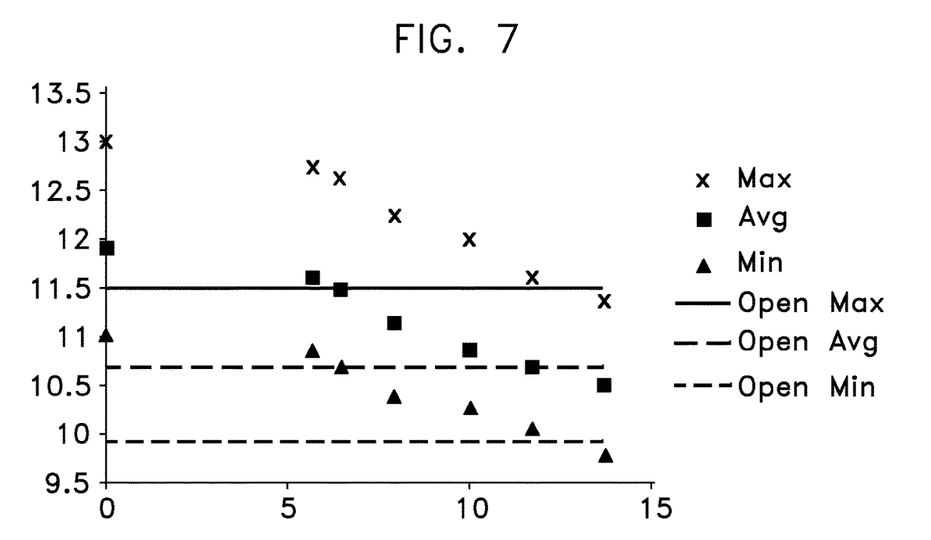
FIG. 7 is an example of measured indications of volume in comparison with reference values according to an embodiment of the present invention.

FIG. 7 illustrates the results of readings obtained using the flow sensor 11 of FIG. 5 under several conditions, plotting Vout against the depth to which an artificial teat was inserted into the teatcup 2 in centimeters.

The maximum voltage, minimum voltage, and average voltage over a pulsation cycle may be seen against the equivalent reading during the open liner 32 condition of FIG. 3d.

Zero insertion corresponds to the condition of FIG. 3c.

It may be seen that a strong correlation exists in each series between depth of teat insertion and volume of air displaced from the teatcup 2.

The processor 12 may therefore determine a connection parameter by comparing the indication of volume of displaced air with a reference value. The reference value may be, for example:

a predetermined value stored in the memory 13 connected to the processor 12; or an indication of volume measured prior to connection of the teatcup 2.

The connection parameter may be used to determine whether the teatcup 2 is disconnected or improperly connected, or the length of the teat protruding into the teatcup 2.

While there is a crossover in the readings at approximately 12 cm, in practice a teat of a dairy animal will not reach this depth.

The processor 12 may determine that the teatcup 2:

has fallen off (i.e. the connection parameter is effectively zero); or is blocked (i.e. the connection parameter is at a maximum).

If either of these is the case, then it may control the robot arm 20 to reapply the teatcup 2 to the teat 36.

If processor 12 determines that the teatcup 2 is connected, albeit incorrectly, or the teat is at too shallow a depth, the processor 12 may control the robot arm 20 to adjust the position of the teatcup 2 rather than attempting to relocate the teat 36 again.

It is envisaged that the processor 12 may be configured to receive an identification of an individual dairy animal being milked, for example using a radio frequency identification tag reader. The processor 12 may cross reference this identification with individual animal data stored in the memory 13 in order to determine expected teat lengths for the animal and ensure optimal connection of the teatcups 2, 3, 4, 5.

In addition to, or in place of, adjusting the position of the teatcups, the processor 12 may be configured to issue an alarm regarding a condition associated with the connection parameter obtained. This may be by way of display of text or lights at the milking device 1 or control module thereof, an audible alarm, a flag in software or any other suitable means known to a person skilled in the art.

In manually operated systems, this will enable the timely reapplication or adjustment of the teatcup 2. In an automatic milking device, recordal of such alarms may allow for identification of ongoing faults requiring either recalibration of equipment, or repair or replacement of faulty components. For example, a fault condition such as a split liner 32 or disconnected hose will show an extreme response which may be identified as requiring attention of an operator.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A control device for monitoring a milking process, the milking process performed by a milking apparatus including at least one teatcup configured to receive a teat of a milking animal and at least one airline configured to deliver varying levels of pressure to the teatcup, the device including:

a flow sensor configured to measure airflow within the airline in order to obtain an indication of volume of displaced air within the teatcup; and at least one processor programmed to:
compare the indication of volume of displaced air with a reference value; and
determine a connection parameter relating to an extent of connection between the teat and the teatcup based on the comparison,
wherein the flow sensor is provided in a part of the airline that is designed to only admit air to the teatcup.

2. The control device of claim 1, wherein the processor is configured to cause a robot arm to adjust a position of the teatcup relative to the teat on the basis of the connection parameter.

3. The control device of claim 1, wherein the flow sensor is a thermistor based flow sensor.

4. A robotic automatic milking implement configured to perform a milking process, the implement including:
at least one teatcup configured to receive a teat of a milking animal;
at least one airline configured to deliver varying levels of pressure to the teatcup;
a robot arm configured to connect the teatcup to the teat; and
a control device for monitoring the milking process, the device including:
a flow sensor configured to measure airflow within the airline in order to obtain an indication of volume of displaced air within the teatcup; and
at least one processor programmed to:
compare the indication of volume of displaced air with a reference value; and
determine a connection parameter relating to an extent of connection between the teat and the teatcup based on the comparison,
wherein the flow sensor is provided in a part of the airline that is designed to only admit air to the teatcup.

5. The milking implement of claim 4, wherein the control device is configured to cause the robot arm to adjust a position of the teatcup relative to the teat on the basis of the connection parameter.

6. The milking implement of claim 4, wherein the flow sensor is provided in a part of the airline that is only intended to admit air to a pulsation space of the teatcup.

7. The milking implement of claim 4, wherein the flow sensor is provided downstream from a filter that filters drawn in ambient air.

8. The milking implement of claim 4, wherein the flow sensor is provided in a part of the airline that is isolated from any vacuum.

9. The milking implement of claim 4, wherein the flow sensor is a thermistor based flow sensor.

* * * * *